United States Patent

Scheel et al.

[11] Patent Number: 6,073,874
[45] Date of Patent: Jun. 13, 2000

[54] SAFETY DEVICE WITH A GREASE RESERVOIR

[75] Inventors: Jörn Scheel, Lübeck; Achim Hurschler, Ellerbek; Jörn Wohlenberg, Hamburg, all of Germany

[73] Assignee: Autoliv Development AB, Sweden

[21] Appl. No.: 09/036,323

[22] Filed: Mar. 6, 1998

[30] Foreign Application Priority Data

Mar. 7, 1997 [DE] Germany .......................... 197 09 468

[51] Int. Cl.[7] .................................................. B65H 75/48
[52] U.S. Cl. ........................................ 242/374; 267/156
[58] Field of Search .................................. 242/374, 371; 267/156; 280/806; 297/480

[56] References Cited

U.S. PATENT DOCUMENTS 2,924,876   2/1960   Lewis .
4,442,674   4/1984   Fohl .
4,444,010   4/1984   Bendler .
5,690,295  11/1997   Steinberg et al. .
5,839,686  11/1998   Dybro et al. .
5,881,962   3/1999   Schmidt et al. ........................ 242/374

FOREIGN PATENT DOCUMENTS 8323264   7/1984   Germany .
1951266  10/1995   Germany .

*Primary Examiner*—Donald P. Walsh
*Assistant Examiner*—William A. Rivera
*Attorney, Agent, or Firm*—Robert W. Becker & Associates

[57] ABSTRACT

A safety device has a grease reservoir for supplying grease to a functional part of the safety device. The grease reservoir includes a capsule containing the grease. The capsule consists of grease-resistant material. The capsule is arranged relative to the functional part such that a designated movement of the functional part during operation of the safety device destroys the capsule and releases the grease.

9 Claims, 1 Drawing Sheet

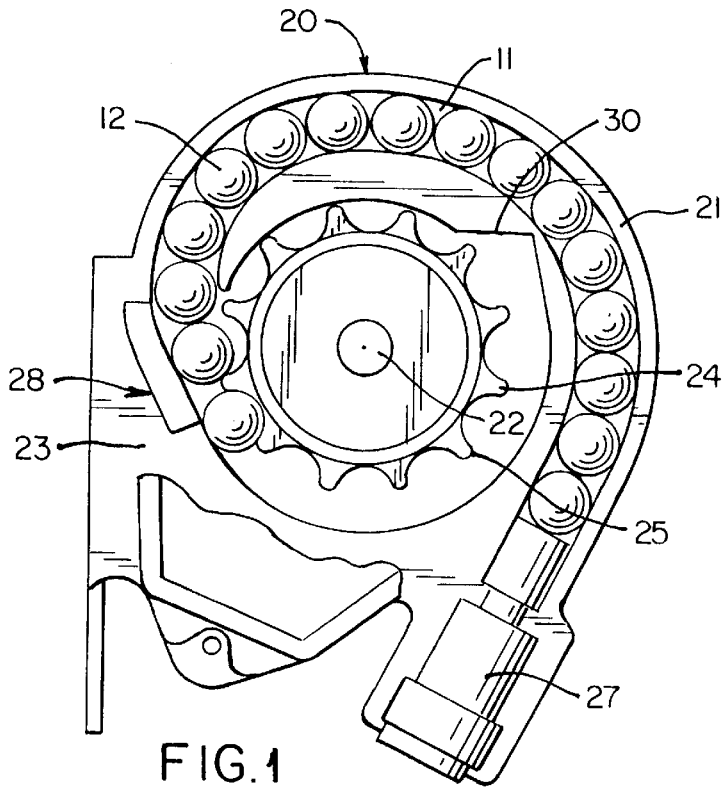
FIG. 1
PRIOR ART
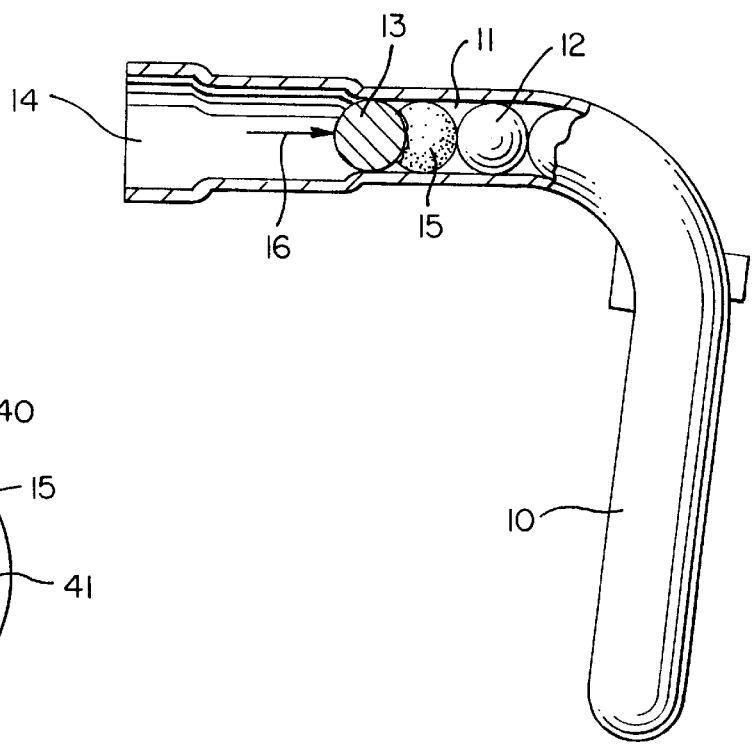
FIG. 2
FIG. 3

SAFETY DEVICE WITH A GREASE RESERVOIR

BACKGROUND OF THE INVENTION

The present invention relates to a safety device such as a safety belt reeling device, tensioning device etc., comprising a grease reservoir correlated with a functional part for greasing the functional part during movement or for greasing one of the individual elements of the functional part.

From German Patent application 195 12 860 a rotational tensioning device is known in which the rotary drive of the safety belt winding shaft includes a drive wheel into which mass bodies are introduced by action of a pryotechnical drive so that the drive wheel and the coupled safety belt winding shaft are rotated. The mass bodies are stored within a channel correlated with the drive wheel whereby at one end of the channel a gas generator for producing the required drive pressure is arranged. For improving greasing of the mass bodies, one embodiment of the known device suggeste to arrange between the individual mass bodies graphite lamellas for improved lubrication of the movement of the mass bodies within the channel and the drive wheel. In this design it is disadvantageous that the graphite lamellas must be produced in a complicated process and positioned between the individual mass bodies. Inasmuch as alternatively the use of conventional grease as a lubricant is contemplated, there is generally the problem of precise and clean supply as well as dosage of such grease during mounting of such a safety device whereby it must be ensured that only the necessary parts are lubricated. A further problem is that over an extended service life of the safety device the grease will age, resulting in a reduction of the lubrication effect. This problem occurs in all safety devices in which moveable functional parts themselves or their individual elements must be lubricated, as, for example, the winding spring of a safety belt reeling device.

It is therefore an object of the present invention to ensure for a safety device of the aforementioned kind a grease supply (lubricant supply) that provides uniform and excellent lubrication while providing at the same time a simple assembly of the safety device.

SUMMARY OF THE INVENTION

A safety device according to the present invention is primarily characterized by:
 a grease reservoir for supplying grease to a functional part of the safety device;
 the grease reservoir including a capsule containing the grease and consisting of grease-resistant material;
 the capsule arranged relative to the functional part such that a designated movement of the functional part during operation of the safety device destroys the capsule and releases the grease.

Advantageously, the grease-resistant material of the capsule is derived from mineral oil or synthetic oil.

Preferably, the capsule has a shape matching the shape of the functional part.

Preferably, the capsule has a break-off location providing a preferred rupture of the capsule for releasing the grease.

Advantageously, the safety device comprises a safety belt reeling device having a winding spring, wherein the capsule is placed in a space two adjacent windings of the winding spring and has a shape matching that space and wherein the capsule is destroyed by the adjacent windings of the winding spring when the winding spring is tensioned.

In another embodiment of the present invention the safety device comprises a rotary tensioner for a belt reeling device including a safety belt winding shaft. The rotary tensioner has a pyrotechnical drive with a drive piston, a channel, and mass bodies passing through the channel for rotating the safety belt winding shaft when actuated by the drive piston of the pyrotechnical drive. The capsule is positioned between the drive piston and one of the mass bodies positioned closest to the drive piston in the channel.

Preferably, a plurality of capsules is provided and the capsules are distributed at a spacing within the channel and are positioned between the mass bodies.

According to the present invention, the grease reservoir includes a capsule that is comprised of a material that is resistant to the grease. The capsule is arranged such in the functional part of the safety device that the designated movement of the functional part during operation of the safety device, or one of its individual elements, results in the destruction of the capsule with release of the grease. The arrangement of the grease in a capsule facilitates mounting of the corresponding safety device because, by providing the lubricant within the capsule, the lubricant remains clean and uncontaminated, is always provided in the same amount, and can maintain the same product quality over an extended period of time. The activation of the grease or lubricant reservoir takes place only after completion of mounting or even after the first operational use, resulting in the special advantage that until the first operation occurs no aging of the grease or lubricant, no drying and thus no reduction of the lubrication action will occur. The capsule to be positioned at the functional part of the safety device is so strong that it will withstand the slight pressure occurring during assembly and will only rupture or burst upon stronger pressure application, as applied after completion of assembly for releasing the grease or as occurring during the first operational activation of the safety device so that the grease or lubricant is only then released from the capsule for providing lubrication.

The use of the capsule also allows for an automated assembly of the safety devices with conventional supply devices, optionally even with already present assembly apparatus.

According to special embodiment of the invention, the capsule is comprised of a material that is based on or derived from mineral oil or synthetic oil. This ensures in an advantageous manner that the capsule material relative to the grease or lubricant employed is resistant and has no negative effect on the lubrication action of the grease.

It is expedient according to one embodiment of the invention to provide the capsule such that it has a shape matching the shape of the space or location where it is to be positioned at the functional part.

In order to ensure that the amount of grease provided within the capsule is released, it may be expedient, according to one embodiment of the invention, that the capsule be provided with a break-off location so as to realize a preferred rupture or breaking location.

The invention relates particularly to safety devices in the form of safety belt reeling devices having a winding spring. The capsule having a corresponding (matching) shape is positioned during assembly between the open spring windings of the winding spring and, after completion of assembly, can be destroyed by tensioning the spring windings. This improves substantially the assembly of a safety belt reeling device whereby, after completion of assembly, the grease supply of the winding spring is initated upon first complete removal of the safety belt and the resulting contacting of the individual windings of the spring at one another, whereby the contacting windings of the spring destroy or break the capsule. The invention, however, also relates to a directed or controlled destruction of the grease capsule after completion of mounting before the winding spring is activated for the first time during operation.

The invention also relates to a safety device is in the form of a rotary tensioner for a safety belt reeling device with a channel for passage of mass bodies used for a rotary drive of the safety belt winding shaft. A pyrotechnically driven drive piston drives the mass bodies through the channel whereby between the drive piston the rotary tensioner and the first mass body positioned within the channel a ball-shaped capsule containing grease is arranged. In this embodiment the grease used as a lubricant for passage of the mass bodies, respectively, of the drive piston through the channel, is stored for movement of activation whereby, when the safety belt reeling device is triggered, the impact of the drive piston onto the capsule destroys the capsule and releases the grease. It is also suggested that between individual mass bodies capsules with grease are positioned in a distributed arrangement throughout the channel. However, it is also possible that already during mounting of the rotary tensioner, by applying pressure onto the last-inserted drive piston, the grease is released from the capsule.

BRIEF DESCRIPTION OF THE DRAWINGS

The object and advantages of the present invention will appear more clearly from the following specification in conjunction with the accompanying drawings, in which:

FIG. 1 shows a rotary tensioner in a schematic plan view onto the end face of a prior art safety belt reeling device, which rotary tensioner acts on the safety belt winding shaft of the safety belt reeling device;

FIG. 2 shows the channel of the rotary tensioner with drive piston, grease capsule, and mass bodies in a part-sectional view;

FIG. 3 shows a plan view onto a winding spring in the relaxed state with capsules positioned between the windings of the springs, whereby this spring is to be placed into the corresponding housing part of the safety belt reeling device.

DESCRIPTION OF PREFERRED EMBODIMENTS

The present invention will now be described in detail with the aid of several specific embodiments utilizing FIGS. 1 through 3.

In the housing 21 of a safety belt reeling device 20 a safety belt winding shaft 22 is supported which penetrates with axial projections the corresponding lateral portions 23 of the housing 21. A drive wheel 24 is supported on one projection in a positive-locking manner. The drive wheel 24 in the shown embodiment is provided with an outer toothing 25.

The lateral portion 23 of the housing 21, respectively, a separate component attached thereto, forms a channel 11 which at one end is provided with, preferably, a pyrotechnical drive 27. The channel 11 or a separate component is embodied at the housing 21, respectively, its lateral portion 23 with a spiral design extending from the outer portion toward the inner portion in the direction towards the safety belt winding shaft 22. The radius of the sprial relative to the safety belt winding shaft 22 decreases until the channel 11 is positioned tangentially relative to the drive wheel 24, respectively, its outer toothing 25. At this location a coupling area 28 for the mass bodies 12 contained in the channel 11 is provided. The mass bodies 12 are driven when actuated by the pyrotechnical drive unit 27 into the outer toothing 25 of the drive wheel 24.

The channel 11 extends over a portion of the circumference of the drive wheel 24 or its toothing 25 and opens into an exit through the opening 3 from opening 30 positioned in a different plane. The mass bodies 12 in the channel 11 exit through the opening 30 from channel 11.

FIG. 2 shows a tube 10 to be connected to the lateral portion 23 of the housing 21. The tube 10 provides a channel 11 with mass bodies 12 arranged therein. In the represented end of the channel 11 the mass bodies 12 have positioned adjacent thereto a drive piston 13 in the form of a ball piston which is actuated by a non-represented gas generator when the safety belt reeling device is actuated. Upon actuation, the piston 13 is forced in the direction of arrow 16 toward the mass bodies 12 and drives the mass bodies 12 through the channel 11.

Between the drive piston 13 and the first mass body 12 a capsule 15 containing grease is arranged. The capsule 15 is shaped to match the shape of the mass body 12, i.e., it is a ball shaped. When the non-represented gas generator is triggered, the drive piston 13 impacts the capsule 15 and destroys it so that the grease contained therein is distributed within the channel 11 and can provide its lubricating action onto the drive piston 13. It is also possible to provide at a certain spacing, for example, after every second or third mass body 12, a capsule 15 within the channel. This embodiment is not represented.

However, it is also possible to fill the curved tube 10 with mass bodies 12 and, after placing the drive piston 13 into the device to actively destroy the capsule 15 for releasing the grease.

Another embodiment of the invention is represented in FIG. 3. Between the spring windings 41 of a winding spring 40 a plurality of capsules 15 is distributed in the circumferential direction of the spring windings 41. The capsules 15 are elongate and match the space between the spring windings. When tensioning the spring windings 41, the capsules are compressed and destroyed so that the grease contained therein is released and distributed across the spring windings 41.

The specification incorporates by reference the disclosure of German priority document 197 09 468.6 of Mar. 7, 1997.

The present invention is, of course, in no way restricted to the specific disclosure of the specification and drawings, but also encompasses any modifications within the scope of the appended claims.

What is claimed is:

1. A safety device comprising:

a grease reservoir for supplying grease to a functional part of said safety device;

said grease reservoir including a capsule containing the grease and consisting of grease-resistant material;

said capsule arranged relative to said functional part such that a designated movement of said functional part during operation of said safety device destroys said capsule and releases the grease;

a safety belt reeling device having a winding spring, wherein said capsule is placed in a space between two adjacent windings of said winding spring and has a shape matching said space and wherein said capsule is destroyed by said adjacent windings of said winding spring when said winding spring is tensioned.

2. A safety device according to claim 1, wherein said grease-resistant material of said capsule is derived from mineral oil or synthetic oil.

3. A safety device according to claim 1, wherein said capsule has a shape matching a shape of said functional part.

4. A safety device according to claim 1, wherein said capsule has a break-off location providing a preferred rupture of said capsule for releasing the grease.

5. A safety device comprising:

a grease reservoir for supplying grease to a functional part of said safety device;

said grease reservoir including a capsule containing the grease and consisting of grease-resistant material;

said capsule arranged relative to said functional part such that a designated movement of said functional part during operation of said safety device destroys said capsule and releases the grease;

a rotary tensioner for a belt reeling device including a safety belt winding shaft;

said rotary tensioner having a pyrotechnical drive with a drive piston, a channel, and mass bodies passing through said channel for rotating said safety belt winding shaft when actuated by said drive piston of said pyrotechnical drive;

wherein said capsule is positioned between said drive piston and one of said mass bodies positioned closest to said drive piston in said channel.

6. A safety device according to claim 5, wherein a plurality of said capsules is provided and wherein said capsules are distributed at a spacing within said channel and are positioned between said mass bodies.

7. A safety device according to claim 5, wherein said grease-resistant material of said capsule is derived from mineral oil or synthetic oil.

8. A safety device according to claim 5, wherein said capsule has a shape matching a shape of said functional part.

9. A safety device according to claim 5, wherein said capsule has a break-off location providing a preferred rupture of said capsule for releasing the grease.

* * * * *